Figure 1:
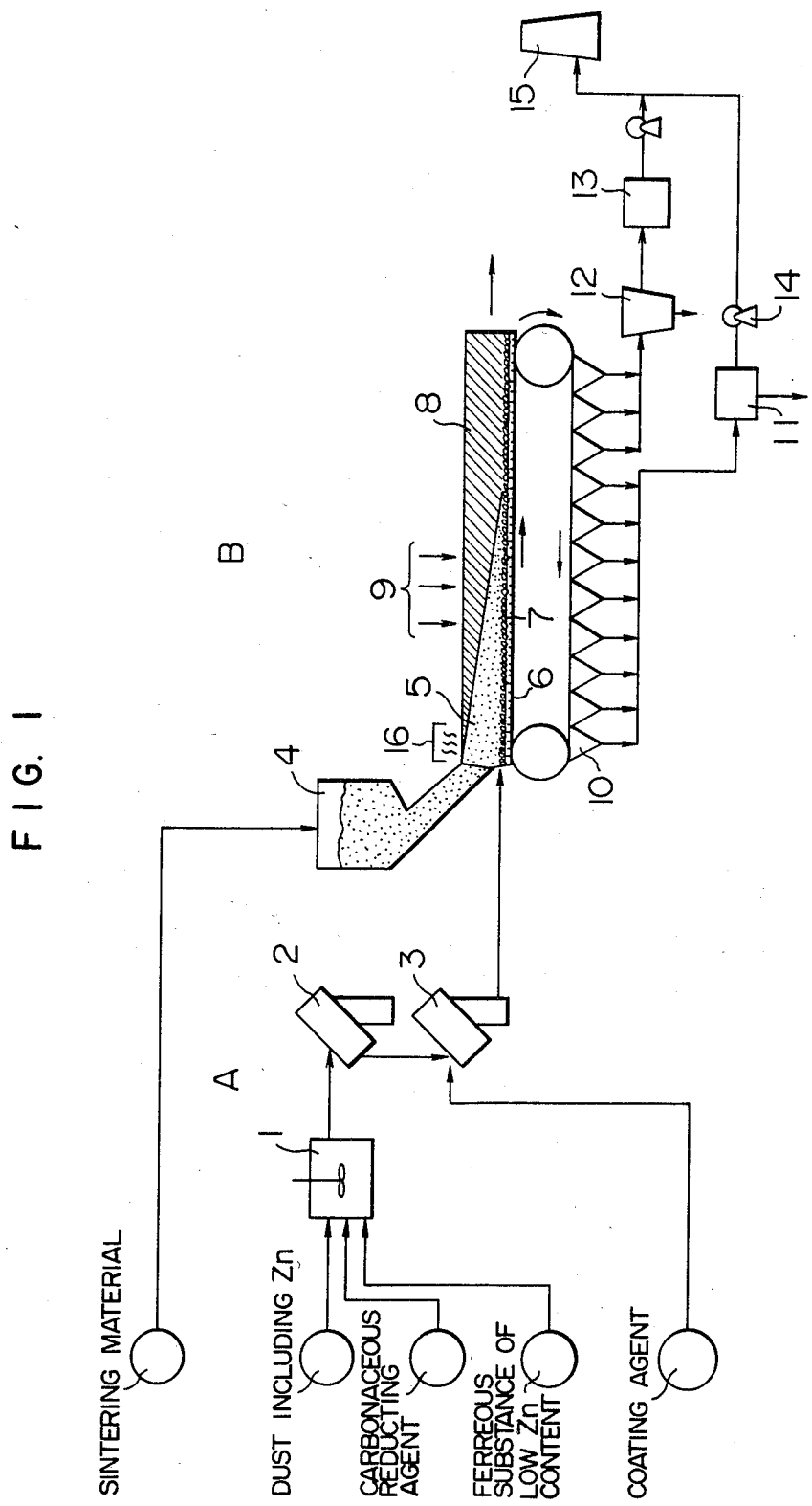

United States Patent [19]

Matsuoka et al.

[11] Patent Number: 4,595,574

[45] Date of Patent: Jun. 17, 1986

[54] METHOD FOR RECOVERING ZINC FROM SUBSTANCES CONTAINING A ZINC COMPOUND

[75] Inventors: Toshio Matsuoka; Shinichi Kurozu; Yukio Koyabu; Tadamitu Nagayasu, all of Niihama; Seiji Sugimori, Saijo, all of Japan

[73] Assignee: Sumitomo Heavy Industries, Ltd., Tokyo, Japan

[21] Appl. No.: 695,030

[22] Filed: Jan. 25, 1985

[30] Foreign Application Priority Data

Jan. 26, 1984 [JP] Japan .................................. 59-11068
Jan. 26, 1984 [JP] Japan .................................. 59-11069

[51] Int. Cl.$^4$ ................................................ C01G 9/03
[52] U.S. Cl. ...................................... 423/107; 423/622; 423/623; 75/86; 75/87; 75/88
[58] Field of Search ................ 423/107, 623, 622; 75/86, 87, 88

[56] References Cited

U.S. PATENT DOCUMENTS

| 1,781,702 | 11/1930 | Pierce | 423/107 |
| 1,936,092 | 11/1933 | Kuzell | 423/107 |
| 2,139,196 | 12/1933 | Maidens | 423/107 |
| 3,850,613 | 11/1974 | Allen | 423/107 |
| 4,447,261 | 5/1984 | Hilbrans et al. | 423/107 |

FOREIGN PATENT DOCUMENTS 54-39241 11/1979 Japan .

Primary Examiner—John Doll
Assistant Examiner—Robert L. Stoll
Attorney, Agent, or Firm—Armstrong, Nikaido, Marmelstein & Kubovcik

[57] ABSTRACT

A method for recovering zinc from substances containing a zinc compound which comprises supplying a carbonaceous substance and a zinc compound-containing substance onto the hearth layer in a sintering apparatus, vaporizing the zinc compound in said substance as metal to separate the compound therefrom by forming a locally strong reducing atmosphere at the combustion temperature of sintering material, oxidizing the resultant vapor-form zinc into zinc oxide under a strong oxidizing atmosphere, and then discharging the resultant zinc oxide as such from said sintering apparatus.

1 Claim, 3 Drawing Figures

METHOD FOR RECOVERING ZINC FROM SUBSTANCES CONTAINING A ZINC COMPOUND

The present invention relates to a method for recovering zinc from substances containing a zinc compound such as dust generated at metal refining or mineral dressing steps.

Various kinds of dust generated, for example, in iron and steel complexes are recovered and reused from the standpoints of effective use of resources and countermeasure for environmental pollution. In this case, however, zinc compounds become the most serious problem. Dust of low zinc content is sometimes supplied directly to sintering apparatus, basic oxygen furnaces, electric furnaces & etc., but in order to reuse dust of high zinc content generated from blast furnaces etc., as a material for iron and steel production, it is necessary to apply a zinc removal treatment to the dust as pretreatment. Typical zinc removal treatments now in use are a classification separation with wet-type cyclones and a reduction vaporization with rotary kilns.

The former wet-type cyclone method is based on the fact that zinc tends to concentrated in smaller particle size region, giving a percent removal (percent zinc removal) of about 60% to about 80%. The latter rotary kiln method is based on the property of metallic zinc, i.e., its boiling point being ca. 910° C., and zinc in the dust is removed mainly by the following reactions:

Boundouard reaction $$C(solid) + CO_2(gas) = 2CO(gas) \qquad (1)$$

Reduction of ZnO and vaporization of zinc:

$$ZnO(solid) + CO(gas) = Zn(gas) + CO_2(gas) \qquad (2)$$

Oxidation and recovery of zinc:

$$Zn(gas) + \tfrac{1}{2}O_2(gas) = ZnO(solid) \qquad (3)$$

The percent zinc removal of the rotary kiln method is 80 to 95%.

As compared with the rotary kiln method, the wet-type cyclone method gives a low treatment cost but has a defect that the percent zinc removal is low. In the rotary kiln method, the percent zinc removal is high as compared with the other method, but its treatment cost is still too high to be paying even if consideration is given to the fact that ferrous dust is converted to reduced pellets. For this reason, the present situation is that the value of the dust as iron and steel-manufacturing resource is estimated low, and that the dust treatment is carried out from the standpoint of countermeasure for environmental pollution rather than from that of the effective use of resources.

An object of the present invention is to solve these problems and thereby to provide a zinc recovery method combining the effective use of dust based on a cheap dust-treatment method (zinc removal method) and countermeasure for environmental pollution. The practice of the present invention makes it possible to collect zinc removed from the dust as a zinc compound in high concentration, thereby supplying the compound to the subsequent metallic zinc refining step as material of high value. Another object of the present invention is to provide a suitable zinc recovery method for recovering zinc by zinc removal treatment of not only dust generated in iron and steel works, but also dust generated from mineral dressing or metal-refining steps.

In order to attain the above objects, the present invention is characterized in that a zinc compound containing substance is mixed, if necessary, with a carbonaceous substance, agglomerated and after optional subsequent coating with a calcium compound, supplied onto the hearth layer in a sintering apparatus; the zinc compound in the substance is metallized by forming a locally strong reducing atmosphere at the combustion temperature of the lowest layer of the sintering material, and consequently vaporized and separated from the agglomerates. Vaporized metallic zinc is oxidized into zinc oxide under a strong oxidizing atmosphere outside agglomerates and then the resultant zinc oxide is discharged as such from said sintering apparatus with flue gas.

Explanation will be given hereinbelow with reference to the attached FIGS. 1, 2 and 3 and one example embodying the present invention.

Figure 2:
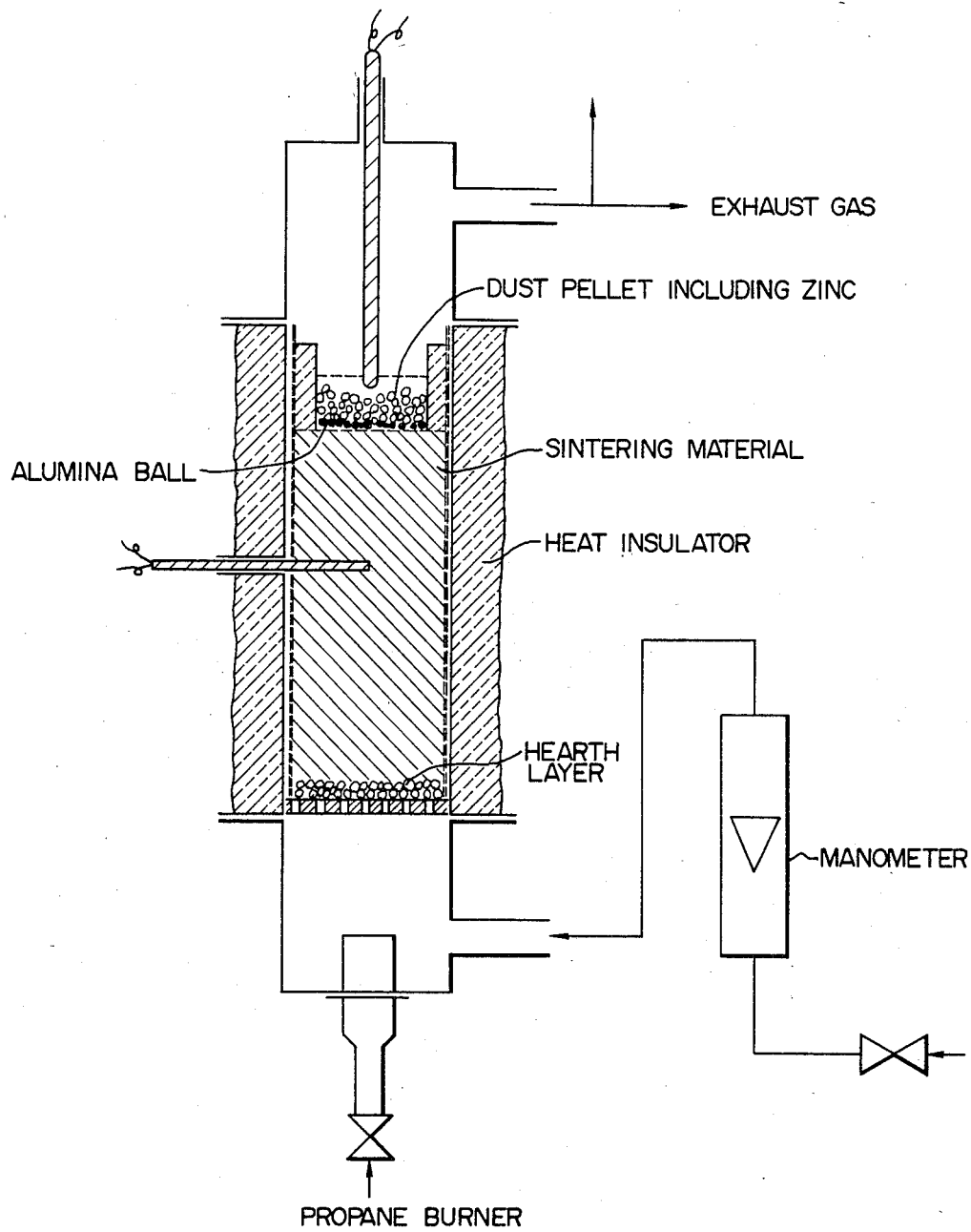
Figure 3:
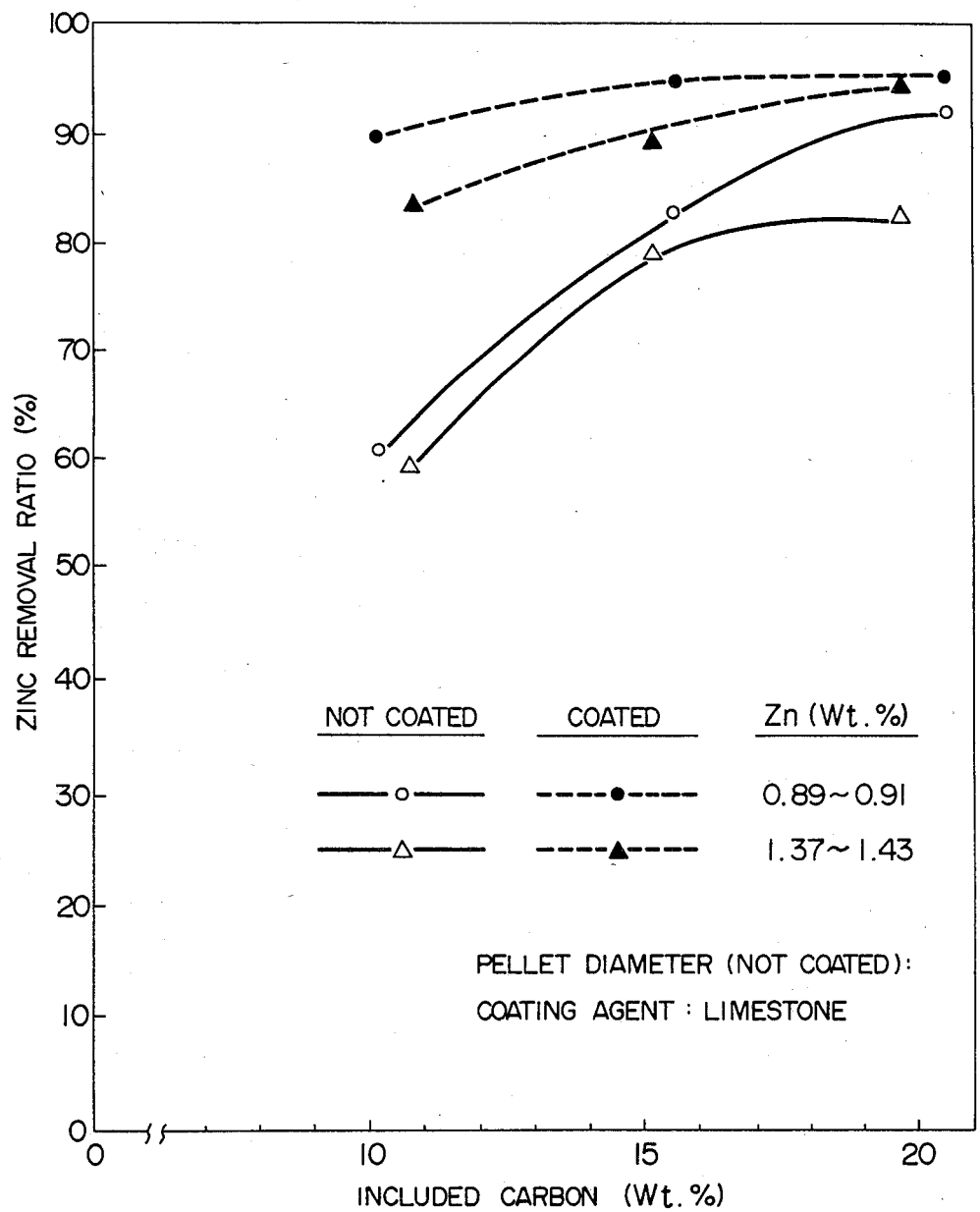

FIG. 1 shows a schematic view illustrating one embodiment of the present invention, FIG. 2 shows a schematic view illustrating a small-sized experimental sintering apparatus used in the experiment, and FIG. 3 shows a graph illustrating the effect on percent zinc removal of the use of carbon- and zinc-including pellets coated with lime stone.

A . . . Kneading and agglomerating step, B . . . zinc removal step, 1 . . . kneader, 2 . . . agglomerator, 3 . . . agglomerator, 4 . . . hopper for sintering material, 5 . . . sintering material, 6 . . . hearth layer, 7 . . . zinc-including dust agglomerate, 8 . . . sinter, 9 . . . introduced air, 10 . . . wind box, 11 . . . dust collector, 12 . . . dust collector (pre-duster), 13 . . . dust collector, 14 . . . blower, 15 . . . chimney, 16 . . . ignition furnace.

As the example, a dust generated in the iron and steel complex is selected as the zinc compound-containing substance, and the common DL-type sintering apparatus is used as the sintering apparatus. In FIG. 1, A shows a step for kneading and agglomeration of dust, and B shows a step for sintering and zinc removal of dust in the DL-type sintering apparatus. The zinc-containing dust, a material, is sent to a kneader 1, and then a carbonaceous reducing agent and a ferrous substance of low zinc content are added to adjust the concentrations of carbon and zinc contained. The dust having been adjusted carbon and zinc contents is sent to an agglomerator 2 and agglomerated. When coating is to be further applied, the agglomerate is sent to an agglomerator 3 wherein it is coated with a substance of low zinc content such as calcium compounds.

The coating agent is for the purpose of protecting the zinc-containing dust from the strong oxidizing atmosphere at the subsequent zinc removal step. Since its zinc content is necessarily zero or extremely low, the coating agent is preferably lime stone or dolomite. Subsequently, the agglomerate is sent to a sintering apparatus and charged in layer, as shown in FIG. 1, between a sintering material 5 and a hearth layer 6 being charged for protecting grate bars.

The sintering material is ignited at the upper surface by an ignition furnace 16, and then burned by introduced air 9 while it moves on the sintering apparatus. The combustion zone of the sinter continuously moves from the upper surface toward the bottom, and after combustion of the bottom layer has been completed, discharged to a cooling apparatus.

For this reason, reaction of the zinc-containing dust pellets charged under the bottom layer of the sintering material takes place in the same position, i.e., the discharge side. Upon beginning of combustion of the lowest layer of sintering material, the above reactions (1) and (2) occur by the action of the carbonaceous substance in the same manner as in the rotary kiln method, whereby metallic zinc is vaporized from the pellet and removed. In the case where the zinc-containing dust pellet has been coated with the coating agent, said pellet is protected from the oxidizing atmosphere as described above, whereby the above reaction (2) is dominant. The vaporized zinc is converted to zinc oxide by the above reaction (3) in the oxidizing stream, and led to a dust collector together with dust generated in the course of sintering.

In this case, as shown in FIG. 1, by separating the exhaust gas generated at the portion wherein said dust pellet layer is exposed to high temperature (in the vicinity of said disharge side) from ones generated at the other portions whereby selective collection of a dust of high zinc content becomes possible. (Further, zinc containing dust comprising coarse particles is removed at a dust collector 12 and recycled as zinc containing substance, and concentrated zinc oxide is collected at a dust collector 13).

The result of experiment on the recovery and removal of zinc from zinc-including dusts by means of a small-sized sintering apparatus is shown below. The percent zinc removal after experiment was calculated by the following equation.

$$\text{Percent zinc removal (\%)} = \frac{Zn - \frac{T.Fe}{T.Fe'} \times Zn'}{Zn} \times 100$$

wherein

Zn: zinc content (%) of the pellet before zinc removal treatment,

Zn': zinc content (%) of the pellet after zinc removal treatment,

T.Fe: Total Fe content (%) of the pellet before zinc removal treatment,

T.Fe': Total Fe content (%) of the pellet after zinc removal treatment.

For agglomerating the dust which is a material, a disc-type pelletizer of 600 mm in diameter was used. When the dust is to be coated with lime stone, the thickness of the coating is preferably 1 mm or less. In order to simulate operation conditions of a commercial sintering apparatus, the small-sized sintering apparatus used in the experiment (FIG. 2) was operated under commercial conditions that the sintering layer be 400 mm in thickness and the superficial velocity in a column be 0.33 Nm/sec. About 100 g (about 2% of the sintering material by weight) of the zinc-containing pellets were fed to the upper surface of the sintering material taking the ease of sampling of the pellet after experiment into account, and air for combustion was introduced from below (refer to FIG. 2).

The effects on the percent zinc removal of the carbon and zinc contents as well as coating are shown in FIG. 3. From this result, it can be seen that there is a close relationship between the percent zinc removal and the contents of carbon and zinc in raw material. This makes it essential to previously adjust the contents of carbon and zinc in order to obtain an optimum percent zinc removal as material for use in blast furnaces.

The present invention is constructed as described hereinbefore, and supply of the zinc-containing substance between the hearth layer and sinter results in that said substance acts as a binder for combining the hearth layer with sinter to form a mass united with the product discharged from the sintering apparatus, whereby the particle size of the product is increased. Further, since the metallization and subsequent vaporization of zinc take place at the same position along the length of the apparatus, i.e., at the place where the lowest layer of the sintering material burns, selective dust collection at such a place of flue gas makes high concentration of zinc oxide possible.

Although in the foregoing examples, the zinc removal and recovery treatment of zinc-containing dust generated in a iron and steel complex by means of a sintering apparatus, the sintering apparatus referred to herein, as can be analogized from the above experimental result, may be considered to include oxidized pellet calcinating apparatus and the like, it is a matter of course that cases of using such apparatus are also included in the technical scope of the present invention.

As explained hereinbefore, the treatment of zinc-containing dusts according to the present invention makes it possible to not only supply a sinter of low zinc content to blast furnaces but also recover zinc from said dust at low costs and with ease.

What is claimed is:

1. A method for recovering zinc from substances containing a zinc compound which comprises supplying a carbonaceous substance and a zinc compound-containing substance, after agglomeration and coating with a calcium compound, onto the hearth layer in a sintering apparatus, metallizing and vaporizing zinc in said substance to separate the compound therefrom by forming a locally strong reducing atmosphere at the combustion temperature of the lowest layer of sintering material, oxidizing the resultant zinc vapor into zinc oxide under a strong oxidizing atmosphere outside agglomerates, and then discharging the resultant zinc oxide as such from said sintering apparatus selectively.

* * * * *